WIDE BAND RECORDING SYSTEM

Original Filed May 4, 1954 9 Sheets-Sheet 1

Inventors:
Thos. A. Banning, Jr & Agnes J. Ranseen,
Executrix of estate of
Emil L. Ranseen, deceased.
by Thos. A. Banning Jr Atty.

Note: Since rate of scan across the tape is constant during each scan the potential developed across the gap (ε or ε') varies proportionately to the strength of the magnetic field carried by the tape at each point of the path so scanned, during translation.

Inventors:
Thos. A. Banning, Jr. & Agnes J. Ranseen,
Executrix of estate of
Emil L. Ranseen, deceased.
by [signature]
Atty.

Inventors:
Thos. A. Banning, Jr. & Agnes J. Ranseen, Executrix of estate of Emil L. Ranseen, deceased
by Thos. A. Banning, Jr. Atty.

Inventors:
Thos. A. Banning, Jr.
& Agnes J. Ranseen,
Executrix of estate of
Emil L. Ranseen, deceased.
by [signature] Atty.

Inventors:
Thomas A. Banning, Jr.,
& Agnes J. Ranseen,
Executrix of estate
of Emil L. Ranseen, deceased.
by [signature] Atty.

Inventors:
Thomas A. Banning, Jr. & Agnes J. Ranseen, Executrix of estate of Emil L. Ranseen, deceased.
by Thos. A. Banning Atty.

WIDE BAND RECORDING SYSTEM

Original Filed May 4, 1954 9 Sheets-Sheet 7

Inventors:
Thos. A. Banning, Jr. & Agnes J. Ranseen, Executrix of estate of Emil L. Ranseen, deceased.
by Thos. A. Banning, Jr. Atty.

WIDE BAND RECORDING SYSTEM

Original Filed May 4, 1954 9 Sheets-Sheet 8

Inventors:
Thos. A. Banning, Jr. & Agnes J. Ranseen,
Executrix of estate of
Emil L. Ranseen, deceased.
by Thos. A. Banning Jr. Atty.

WIDE BAND RECORDING SYSTEM

Original Filed May 4, 1954

Inventors:
Thos. A. Banning, Jr. & Agnes J. Ranseen, executrix of estate of Emil L. Ranseen, deceased.
by Thos. A. Banning, Jr. Atty.

3,164,685

WIDE BAND RECORDING SYSTEM

Thomas A. Banning, Jr., 5520 South Shore Drive, Chicago 37, Ill., and Emil L. Ranseen, deceased, late of Chicago, Ill., by Agnes J. Ranseen, executrix, Evanston, Ill., assignors, by direct and mesne assignments, to Thomas A. Banning, Jr., Chicago, Ill., as trustee Original application May 4, 1954, Ser. No. 427,428, now Patent No. 2,976,354, dated Mar. 21, 1961. Divided and this application Mar. 9, 1961, Ser. No. 94,651
19 Claims. (Cl. 179—100.11)

This invention concerns itself with the production of tape recordings involving sound record recordings, as well as recordings of both sound signals and video signals on one and the same tape, to ensure exact synchronism and harmony of the subsequent play-backs from such recordings; and also concerns itself with sound signals recordings and play-backs, under a system by which very faithful recordings and play-backs of the sound waves may be recorded, without use of excessive tape speeds for receiving and carrying the sound signals. In connection with such sound signals recordings and play-backs, the invention also concerns itself with a system of recording and play-back such that it is possible to record radio frequency signals on the tape, and during play-back supply such radio signals as a play-back operation, to the conventional radio receiver set, so that the thus recorded program, on such radio frequency recording, may be faithfully reproduced in such conventional receiver.

In connection with the foregoing, it is a further object of the invention to provide a system including the tape recorder and play-back means, whereby it is possible to record on the tape all radio frequency signals being received at the antenna or other corresponding unit, including all such radio frequency programs coming to such antenna under sufficient strength for reception and recording, or for conventional reception by a radio or television receiver; and to provide for play-back to a conventional audio radio receiving set or television receiving set, by proper tuning of such radio or television set to the radio frequency or channel on which the desired program will be found.

This application is a division of the parent application of Thomas A. Banning, Jr., and Emil L. Ranseen, now deceased, for Improvements in Tape Recording and Translating and the Like, Serial No. 427,428, filed May 4, 1954, and issued as Letters Patent of the United States, No. 2,976,354, March 21, 1961. In that earlier parent application there are disclosed novel means for producing cross-scanning operations on a tape of width sufficient to accommodate the intended lengths of the cross-scans (across the tape), with the successive scans close together, so that many such cross-scans may be executed per lineal unit of the tape—for example each inch. Accordingly, the number of signals which may be recorded per lineal inch of the tape is multiplied by the number of signals carried by each cross scan, assuming that the cross scans are executed as close together as the possible spacing of conventional lineal signals; otherwise the number of signals which may be recorded per lineal inch of the tape, may, under such cross-scanning operation, be multiplied by such number of signals per cross-scan, divided by the decreased number of cross scans per inch as compared to the spacing of signals under conventional lineal scanning operations.

Due to the possible enormous increase in the number of signals which may be recorded per unit length of the tape (e.g., per inch), when using the cross-scanning technique, it is possible to produce recordings at the rate of many megacycles per second, without need of using tape speeds exceeding conventionally accepted satisfactory tape speeds, e.g., of the order of 15.75 to 31.50 inches/sec. Higher tape speeds will of course enable recording of proportionately higher signals frequencies than are conventionally being used for television programming.

In the parent application, of which this case is a division there are disclosed improvements in the production and translation of such cross-scanning recordings, by use of a deflectable beam, electron beam tube arrangement, with the cross-scans produced by the horizontal deflections of such beam, and with translation of the beam strengths into forces suitable for producing the recordings or for producing translations for play-back. Since such various means are fully disclosed in the said application and Letters Patent No. 2,976,354, it is not deemed necessary to repeat such disclosures in detail here; but there are included in this application such portions of such earlier disclosures as will facilitate an understanding of the manners of application of such cross-scanning arrangements for the purposes of the present improvements.

It is now noted that the radio frequency signals conventionally being used range between 550 kc. (approximately) to 1600 kc. (approximately); so that correspondingly such frequencies range between 0.550 mc., and 1.600 mc. Such frequencies could be recorded by lineal signal recordings, only with tape speeds of upwards of 550 inches/sec. to 1600 inches/sec., on the assumption that 1000 signals may be well recorded per lineal inch, without cross-talk between play-backs of such signals. On the assumption that 1000 signals may be successfully recorded and played back, per inch, and with a cross-scan of two inches length (across the tape), it is possible to record approximately 2000 signals per cross-scan; and with a placement of not over 500 cross-scans per lineal inch of the tape, it is possible to record 500 times 2000 signals per lineal inch of the tape, or 1,000,000 signals per lineal inch. Accordingly, if desired, it is possible to record 1,500,000 signals per sec. with a tape speed of only 1.50 inches/sec.; or with cross-scans spaced 50 per lineal inch of the tape, such 1,500,000 signals per sec. may be recorded with a tape speed of only 15 inches/sec. Conversely, by placing the cross-scans closer together than 50/inch, it is possible to record proportionately higher radio frequencies than 1,500,000/sec., without exceeding the lineal speed of 15 inches/sec. Or, again, with the cross-scans set closer together than 50/inch, it is possible to record the 1,500,000 signals/sec. with lower tape speeds than such 15 inches/sec.

Having produced the radio frequency signals by cross-scanning operations, such signals may be "played-back"; but since such recording includes all of the radio frequency signals touching the antenna (with proper amplification), it is possible, by play-back with a conventional tuning receiver, to select that program from the many which may be included in such recording, by proper tuning of such receiver to the radio frequency of the carrier wave carrying such program, and which radio frequency is included among those thus recorded. In such case the antenna connection of the tunable receiver is switch connected to the sensing and amplifying equipment of the recorder, so that the radio frequencies from the tape recording are now delivered to the receiver instead of delivering the radio signals to such receiver directly from the antenna. Thus, any selected program may be played by conventional tuning, and at another time the same tape-recording may be again used for play-back, and by then tuning the conventional receiver to another selected program, it is possible to bring such other program into play.

The hereinafter disclosed features include the means to make possible such a system of operation.

The present application thus discloses means for producing a recording of all of the radio frequency signals touching the antenna, amplifying them, recording them by cross-scanning on the tape (or other forms of recording), switching the sensing and scanning means into connection with the receiver, and playing-back a selected program, or any one of the programs which shall be included in such radio frequency recordings. Such means includes means whereby any one of the radio frequency programs being received by the antenna may be tuned and played by the receiver while the recording of all the radio frequency programs being touched by the antenna is proceeding; so that after such recording of all the programs has occurred, that program which was simultaneously played by the receiver while such recording was proceeding, may be re-played; or, under control of the tuning means of the receiver, any other recorded program may be tuned and played-back by such receiver.

As disclosed in said parent application, Serial No. 427,428, Patent No. 2,976,354, such cross-scanning operations may be used for producing a recording of a televised program, with means to ensure production of a cross scan of recording corresponding to each horizontal scan or deflection of the kinescope beam. Such recording is accompanied by placement of synchronizing signals on the tape harmoniously with reception of such signals over the antenna connection, and corresponding to the use of such synchronizing signals for maintaining the televised reception in frame harmony with the operations at the sending station. Such synchronizing signals are then sensed during play-back, to produce corrections of the scans produced by the kinescope beam, and to ensure harmony of the frames of picture produced by the kinescope, with the frames scanned at the sending station.

In the present application there are disclosed means to produce cross-scans of the audio frequency interpretations produced in the television receiver, corresponding to the sound translations of such receiver, and in synchronism with the cross-scanned recordings of the picture signals. There are also disclosed means to sense and translate such so-recorded audio signals, in the television receiver by suitable switching facilities. Conveniently, but not necessarily, such cross-scan recordings of the audio are produced in exact synchronism with the cross-scans of the picture signals, so that under these conditions there are produced as many cross-scans of the audio recordings, as there are cross-scans of the picture signals; and at spacings along the tape equal to those between the cross-scans of the picture recordings. In fact, such audio cross-scans may be superimposed on the picture recording cross-scans, and during play-back such two sets of signals will be properly separated and translated, the audio signals as sound interpretations, and the picture signals as kinescope strength controls.

Under present FCC specifications, there are produced 15,750 horizontal scans of the kinescope beam per second, there being 525 lines per picture frame, and 30 such frames per second. Accordingly, when recording the audio signals by cross-scanning, with the same number of audio cross-scans as there are picture cross-scans, it is evident that there will be produced 15,750 cross-scans of the audio recording per second; and with a tape speed of 31.50 inches per second, such cross-scans will be separated by two mils from each other (being 500 cross-scans per lineal inch of the tape). Under these operational conditions it is seen that very great fidelity of recording the sound waves may be ensured, even for such high sound notes as 15,750 vibrations/sec., generally much above the maximum which may be sensed by the human ear. Also, even such high audio frequency recordings as 15,750 c.p.s. will be produced with each sound wave recorded as a complete scan across the recorded width of the tape; so that the most minute variations in timbre of such sound waves may be faithfully recorded. Recordings of sound waves of less frequency will, of course, occupy more than a single cross-scan, and the low frequency waves will occupy many successive cross-scans, with correspondingly faithful recording.

The present application discloses all such means as hereinbefore referred to, for producing and playing-back such audio signals, by the cross-scanning operations.

Other objects and uses of the invention will appear from a detailed description of the same, which consists in the features of construction and combinations of parts hereinafter described and claimed.

In the drawings:

FIGURE 1 shows a face view of a section of signal recording tape having recorded thereon a series of cross-scanned sound signal recordings, together with regularly located synchronizing signals recordings, placed on the tape during the sound or radio or audio signal recordings, and to be used during sensing and translation of such so-recorded signals, if need be;

FIGURE 2 shows a view corresponding to that of FIGURE 1; but in FIGURE 2 there is shown an electronic deflectable beam scanning unit in place with respect to such tape section, and usable to sense and translate recorded audio signals carried by such tape, with use of lateral deflections of the electron beam of such sensing unit corresponding to each of the cross-scans; such cross-scanning means being fully disclosed in the parent application, Serial No. 427,428, Patent No. 2,976,354, and in one or more divisional applications based on said parent application and patent:

FIGURE 3 shows a view similar to that of FIGURE 2; but in the showing of FIGURE 3 there are included two such deflectable beam cross-scanning units, in series alignment along the tape, one such unit constituting a picture signal recording and/or sensing and translating unit, and the other such unit constituting a radio or audio signal sensing and translating unit;

FIGURE 4 shows a fragmentary plan view corresponding to a portion of either of FIGURES 2 or 3; and FIGURE 4 also shows a pair of conductors extending across the record carrying width of the tape, and separated by a narrow air-gap, to be used during recording and translating operations, according to various of the disclosures of such parent application and patent; and according to the disclosures included in one or more of the divisional applications based on such parent application; and FIGURE 4 also shows, schematically, a simple form of circuitry for use in connection with such recording operations;

Figure 1:
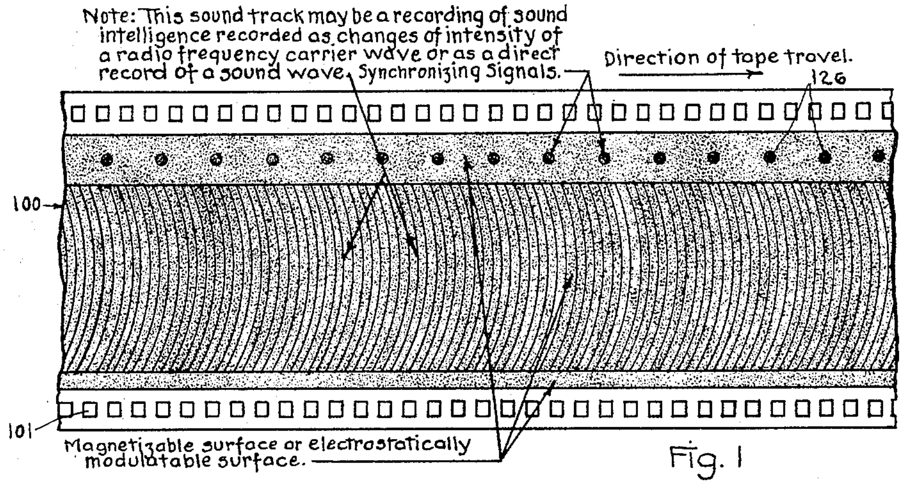
Figure 2:
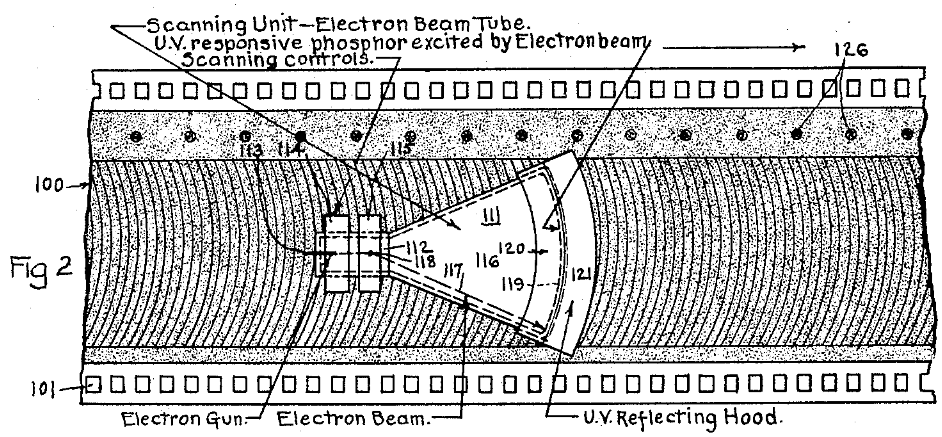
Figure 3:
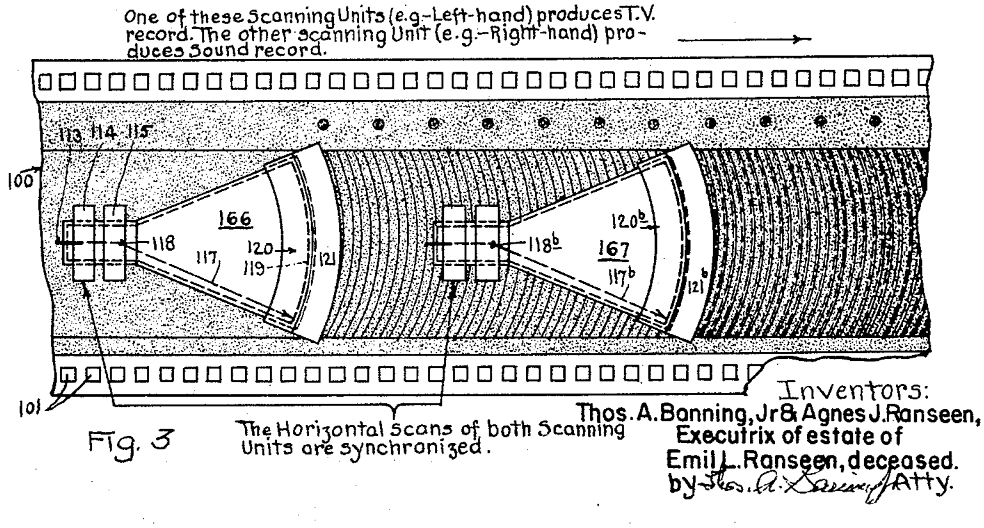
Figures 4, 6:
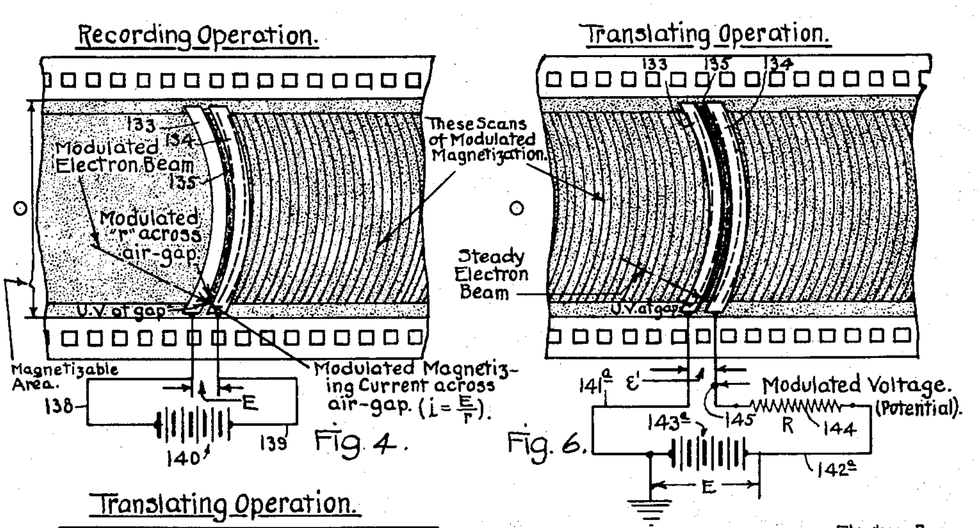
FIGURE 6 shows a view similar to that of FIGURE 5; but FIGURE 6 shows schematically another simple form of circuitry, for sensing and translating the previously recorded signals.
Figure 7:
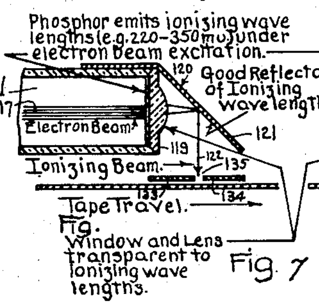
Figure 8:
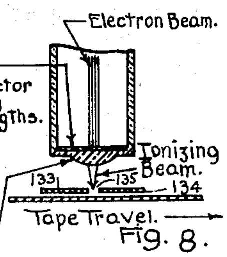
Figures 9, 10:
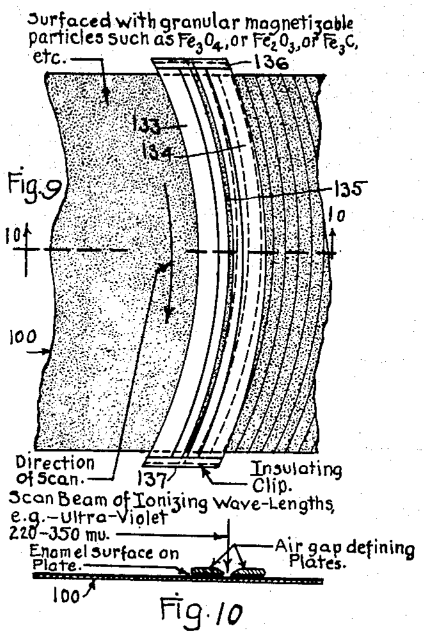
Figure 14:
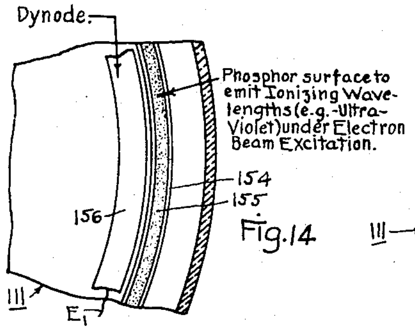
Figure 15:
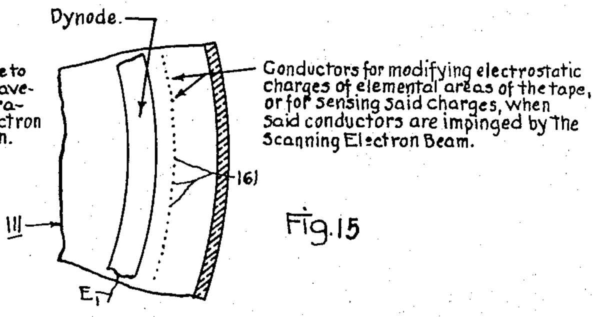
Figures 11, 12, 16, 17:
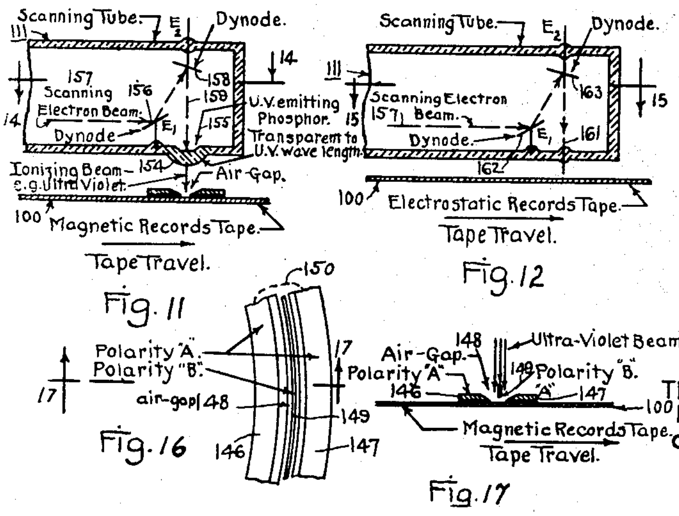
Figure 13:
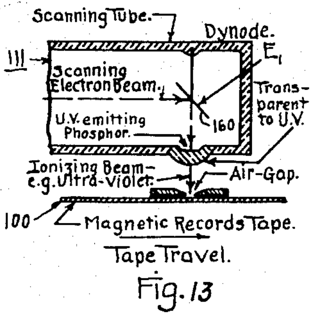
Figure 18:
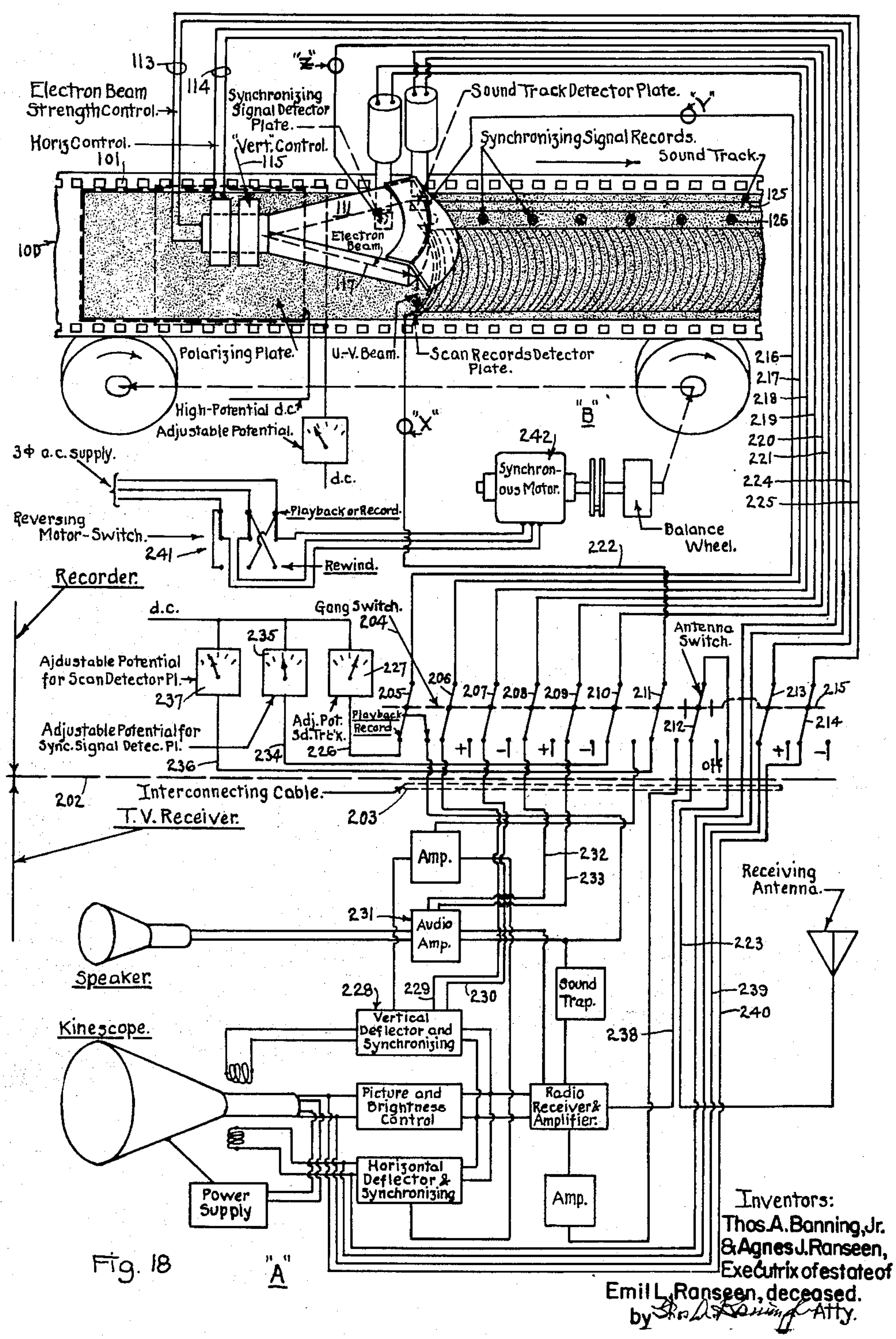
Figure 19:
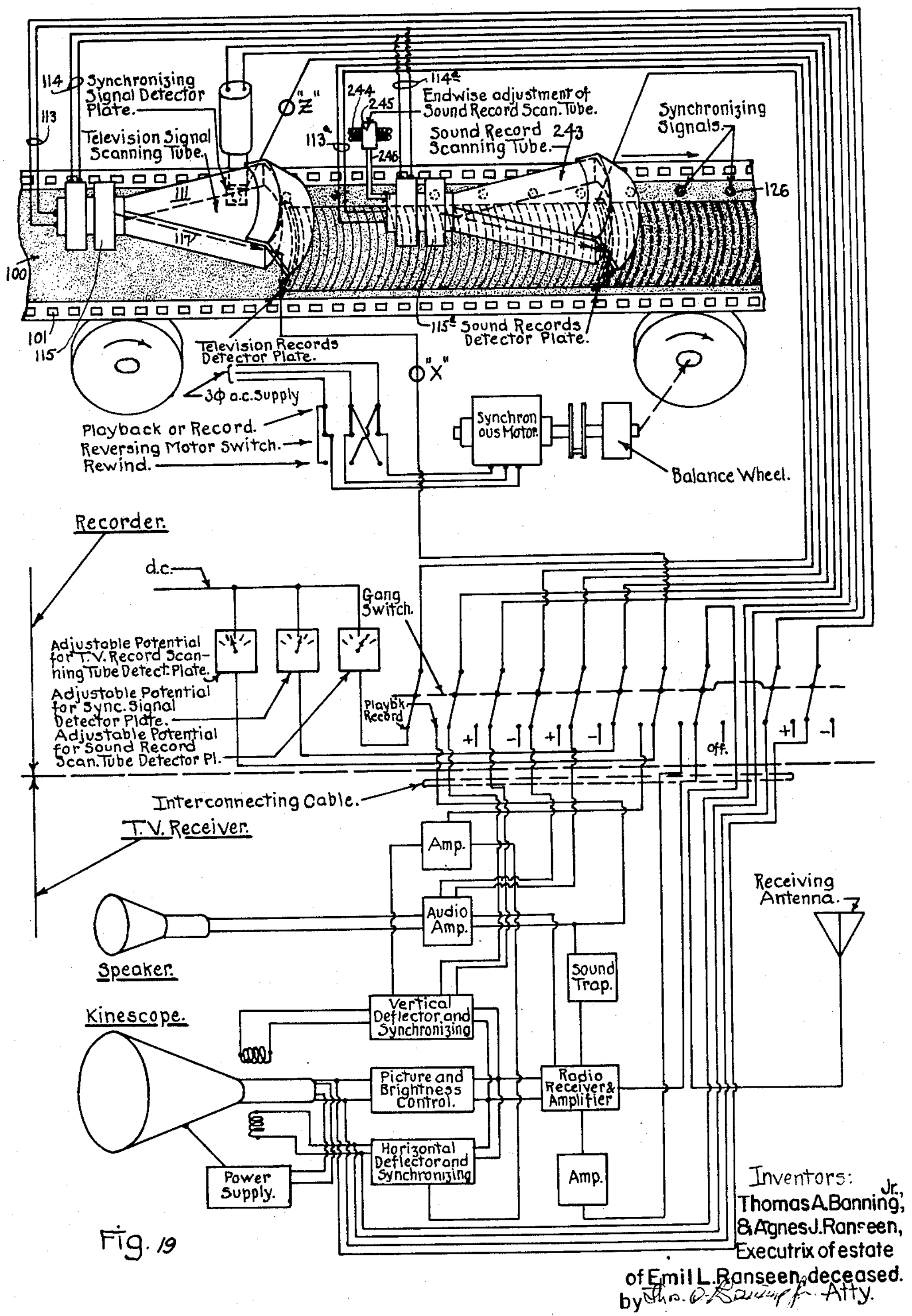
Figure 20:
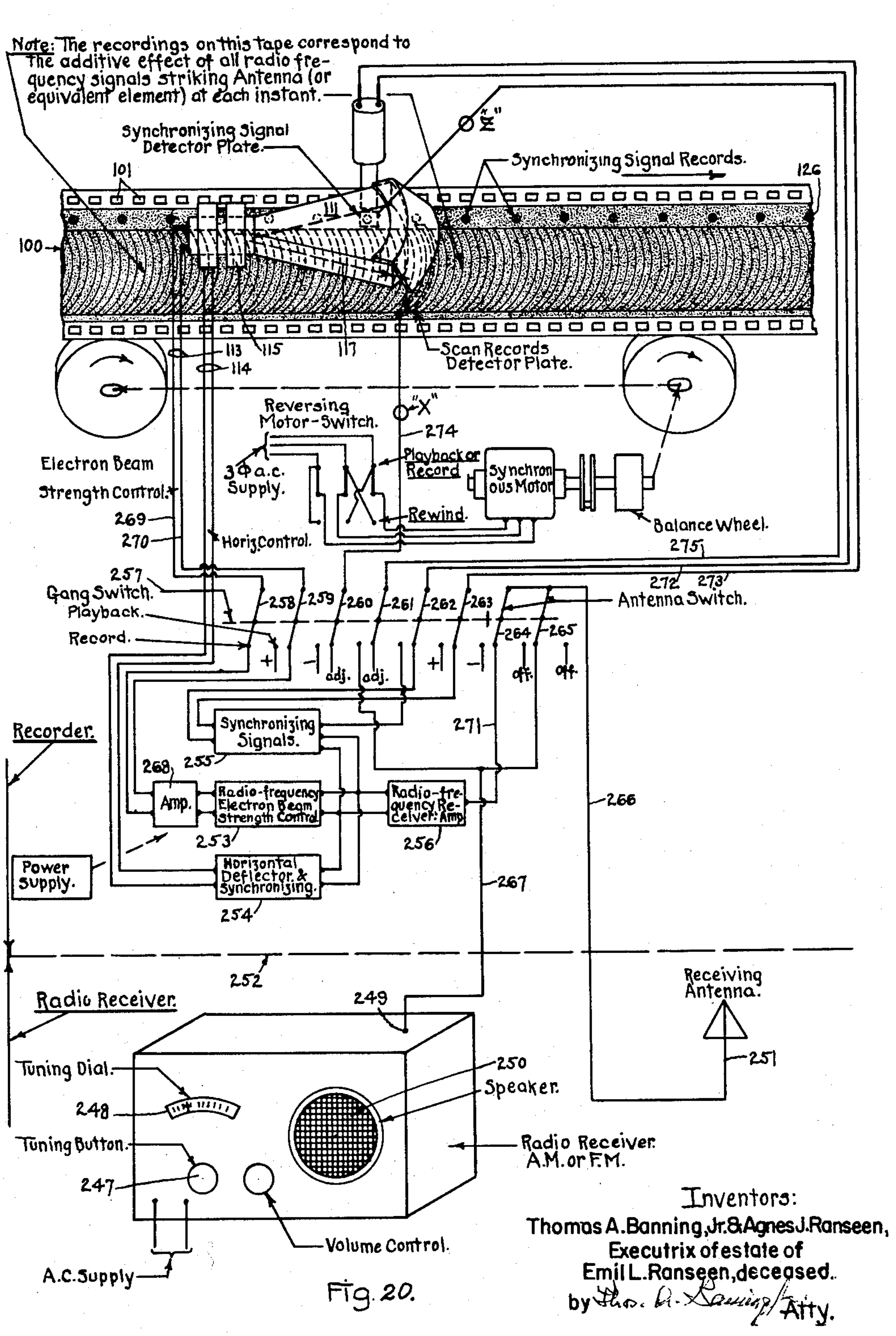
Figure 21:
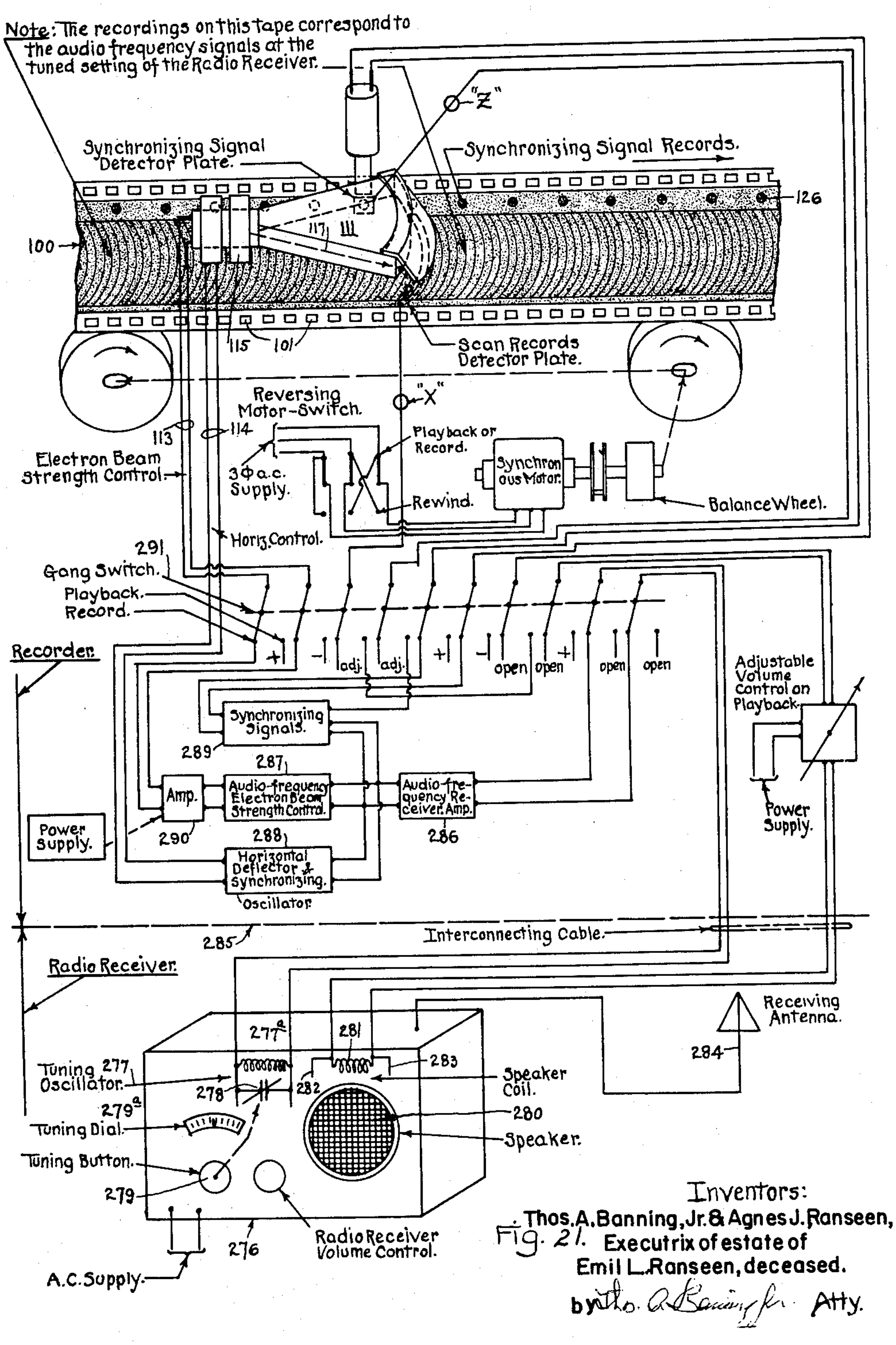
Figure 22:
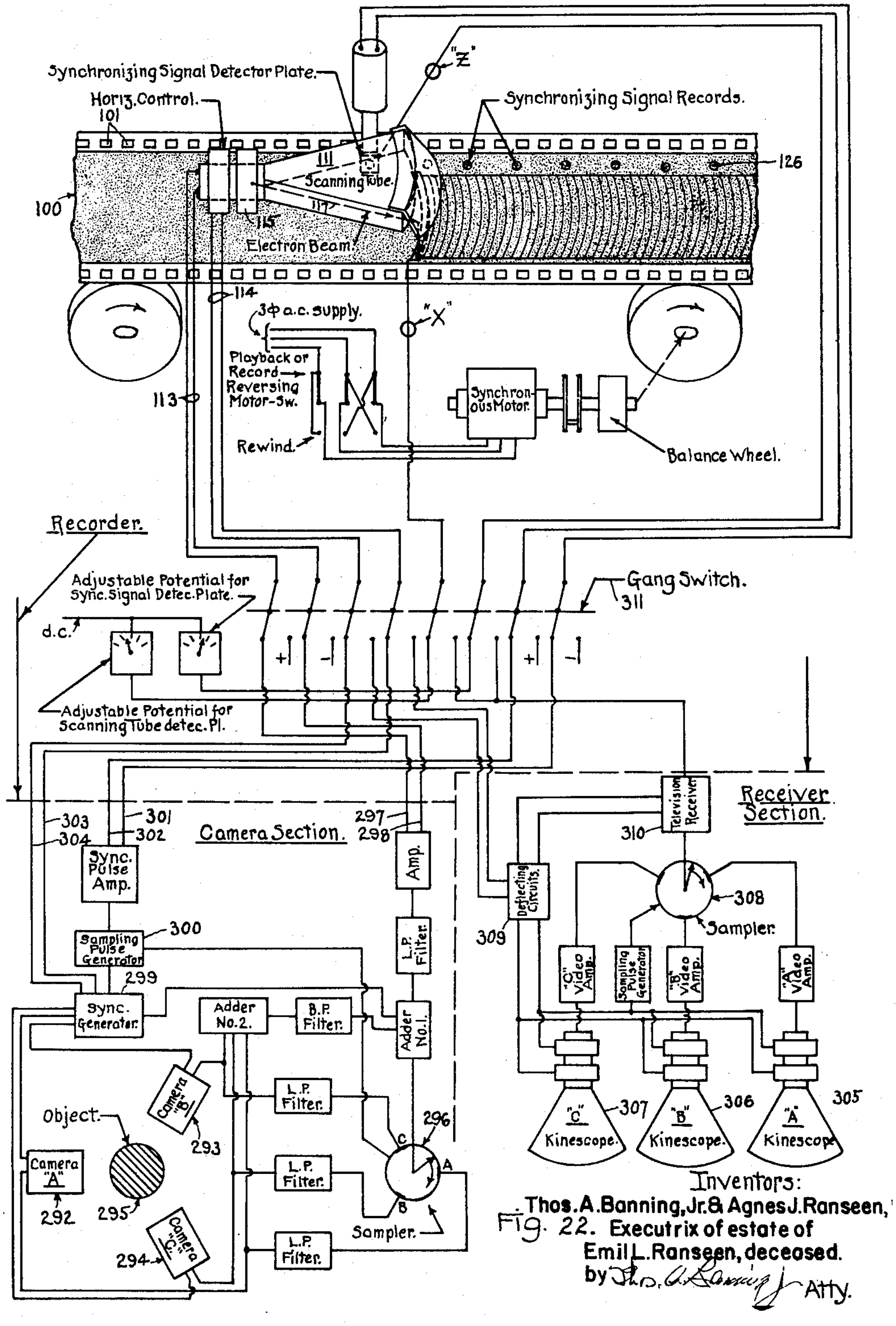
Figure 23:
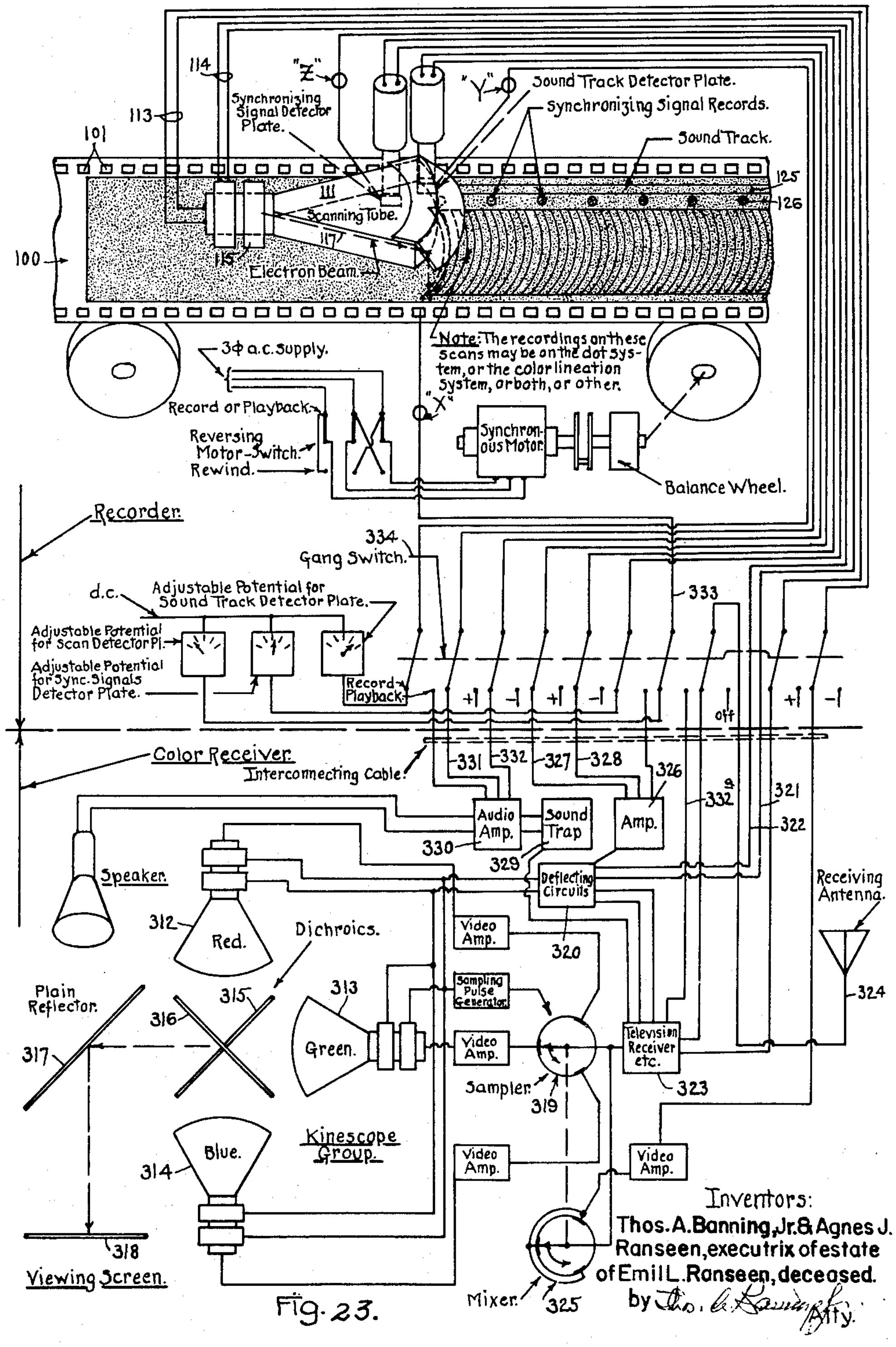

FIGURE 7 shows a fragmentary vertical section through the end portion of the deflectable beam scanning unit of previous figures of this case; and this figure shows the window in the end of the envelope, and transparent to ionizing wave-lengths, together with the target surface of phosphor which is constituted to produce such ionizing wave-lengths under electron beam excitation, for direct passage through the window of the envelop, to the exterior of such envelop; together with a reflector outside of the envelop, constituted to receive the ionizing wave-lengths beam emerging from the window, and deflect such beam directly down towards the tape surface; together with the two conductor arrangement establishing the narrow air-gap which is ionized at an elemental area to produce conductivity between such two conductors;

FIGURE 8 shows a view similar to that of FIGURE 7; but in FIGURE 8 the electron beam extends in vertical direction so that it impacts the phosphor surface directly, and so that the so-produced ionizing wave-lengths beam may be transmitted directly through the window, and to the air-gap without need of direction change produced by reflecting means;

FIGURE 9 shows another fragmentary view similar to that of FIGURE 4, but without the circuitry of FIGURE 4; and FIGURE 9 shows how the two conductors which produce the air-gap between them are connected together at their ends, by insulating clips, connected to the end portion of the envelope, or to other suitable supporting means;

FIGURE 10 shows a fragmentary vertical section, taken on the line 10—10 of FIGURE 9, looking in the direction of the arrows;

FIGURE 11 shows a fragmentary vertical section through the end portion of the scanning unit of form embodying the window in its lower wall, facing towards the translating conductors; and in this embodiment there are provided two dynodes, one in the path of the beam from the beam source (such as the gun), set to reflect the beam upwardly at an angle, and at the same time to amplify the beam by secondary emission, and the other located between such first dynode and the phosphor surface, and set at angle to reflect the firstly amplified beam down towards such phosphor surface, with a further amplification by secondary emission;

FIGURE 12 shows a view similar to that of FIGURE 11; but in the present embodiment the window of material transparent to ionizing wave-lengths has been superseded by an arrangement embodying a series of small conductors extending through the wall of the envelope, and set at positions such that their inner ends are impacted by the two dynode amplified electron beam during its scan, the outer ends of such conductors being located close to the surface of the tape whereon the recordings are to be made, to produce the desired recording on such surface;

FIGURE 13 shows another view similar to that of FIGURE 11; but in the present embodiment there is included only one dynode set to reflect the electron beam directly to the phosphor surface, with amplification of such beam by secondary emission;

FIGURE 14 shows a horizontal section taken on the line 14—14 of FIGURE 11, looking in the direction of the arrows;

FIGURE 15 shows a horizontal section taken on the line 15—15 of FIGURE 12, looking in the direction of the arrows;

FIGURE 16 shows a fragmentary detail of another embodiment of the conductors and air gap arrangement for producing a force which may be used for producing the recordings by magnetic effects on the magnetizable surface of a tape, or for sensing and translating magnetic recordings carried by such tape; and in this embodiment of such conductors there is provided a third conductor between the two outside conductors, for producing a bipolar recording on the tape or for sensing the recordings carried by such tape;

FIGURE 17 shows a fragmentary vertical section taken on the line 17—17 of FIGURE 16, looking in the direction of the arrows;

FIGURE 18 shows, more or less schematically, a simple arrangement embodying the cross-scanning recording means, to enable the recording of a televised program, when such recording unit is used in conjunction with a more or less conventional form of television receiver, such television receiver being provided with the usual antenna connection, the usual controls for picture and brightness, the usual kinescope and speaker arrangement, the usual horizontal and vertical deflector and synchronizing means and arrangements, and other conventional elements; and in this figure there are shown suitable switching arrangements whereby the recorder may be caused to perform a recording operation on its tape, according to the cross-scanning principle, together with production of a sound track recording, and production of the necessary synchronizing signal recordings, or whereby the so-recorded record may be played-back to the television receiver by a simple switch reversing operation, accompanied by the necessary tape rewind to a beginning point; and in this figure the sound track is produced linearly along the edge portion of the tape;

FIGURE 19 shows, more or less schematically, a modification of the showing of FIGURE 18, such modification consisting principally in the production of the sound recordings as cross-scans conveniently superimposed on the cross-scans of the picture recording; for which purpose the arrangement shown in FIGURE 19 includes two deflectable beam tubes located at lineal separation along the tape travel, in which case the sound recordings, while made simultaneously with the picture recordings, will be displaced lengthwise of the tape by the amount of such lineal displacement; and in this figure there is shown means to effect accurate adjustment of at least one of the scanning tubes lengthwise of the tape, so as to ensure correct registry of both tubes with the cross-scans produced during the recording operation now being sensed and played-back;

FIGURE 20 shows, more or less schematically, a single arrangement embodying the cross-scanning recording means, for enabling the recording of all radio frequency signals received from the antenna of a radio receiver of conventional type, with amplification, without need of pre-selecting any given station which may be within receiving range, so that thereby a full recording is placed on the tape of all the radio frequency signals thus striking the antenna, coming in at various radio frequencies of carrier waves; and with provision for also, by a simple switching operation, and with proper previous rewind of the so-recorded signals, playing-back all such signals into the antenna connection of the radio receiver, so that the tape recorded signals exactly simulate the total of the radio frequency signals which were sensed by the antenna during the recording operation; and so that the operator may then select from such so-recorded radio frequency signals that carrier wave frequency which carries the program of his selection for play-back; and in the arrangement shown in this figure the recorder itself is provided with suitable deflection control means and saw-tooth generating means, and synchronizing signal means, to effect the necessary controls of the operations of the recorder elements;

FIGURE 21 shows, more or less schematically, a simple arrangement embodying the cross-scanning recording means, for enabling the recording of only that selected program which is at the time of such recording, tuned for reception and translation in the conventional way by the radio receiver; and with suitable switching means of simple form to enable play-back of such so-recorded program, having previously produced necessary rewind of the tape of the recorder; and in this showing there is also included suitable deflection control means and saw-tooth generating means, and synchronizing means, as a portion of the recorder itself, to enable and effect the necessary controls of the operations of the recorder elements;

FIGURE 22 shows, more or less schematically, a simple arrangement embodying the cross-scanning recording means disclosed in the parent application, Patent No. 2,976,354, and in divisional cases based thereon, for enabling the simultaneous production of recordings on the tape of a plurality of picture recordings; as for example, several industrial operations which are related to each other, by use of corresponding camera arrangements to emit television signals for such several operations, to mix such signals according to a selected means, such as by mixing the highs of high frequency waves coming at equal frequency but with phase displacements from each other according to a well known scheme in use at the present time, and with placement of such so-mixed highs on the tape under recorded conditions, including the cross-scans means herein disclosed; together with simple switching means to enable the playing-back of such so-mixed signals and proper sampling of the signals, and forwarding of them to corresponding television kinescopes for simultaneous production of the several so-televised and recorded operations; the arrangements including necessary deflection control means, and saw-tooth generating means, and synchronizing control means, to effect the needed controls of the operations of the recorder and kinescope elements as required; and FIGURE 23 shows, more or less schematically, a simple arrangement embodying the cross-scanning recording means herein disclosed, for enabling the recording of the signals received at a color television receiver from a selected channel, placing all such signals on the tape in proper relationship, to make a full recording of all such signals in proper relationship, together with simple switching means to enable play back of such so-recorded color television program onto a suitable color or monochrome television receiver.

In each of FIGURES 2, 3, 18, 19, 20 and 21, there is shown a cross-scanning unit 111 (two being shown in FIGURE 3, designated as 166 and 167, respectively), in place with respect to a record receiving and carrying tape 100; and in such FIGURES 18, 19, 20 and 21, there are shown schematically, means to drive such tape, in conventional or suitable form. In each of such figures, also, numerous cross-scans are indicated by the curved crosswise extending lines which designate locations at which cross-scans have been or may be produced or sensed by the unit 111, or 166 or 167, as the case may be. Each such scanning unit is shown as including means to produce an electron beam within the envelope of such unit, means to produce lateral deflections or swings of such beam, and means to produce, exterior to the envelope of such unit, a scanning force whose strength is proportional to the strength of the beam within the envelope, and whose cross-scanning operation is produced in exact synchronism with the deflections of the beam within such envelope. Means are also shown for translating such scanning force into a corresponding recording on the tape, in the case of a recording operation; and for sensing and translating previously recorded signals carried by such tape, with sensing of the scans in sequence corresponding to the sequence under which they were recorded.

Various details of such scanning units are shown in FIGURES 7, 8, 9, 10, and 11 to 17, inclusive, such figures also including showings of alternative embodiments of details. Included in such details are means to produce the lateral or horizontal deflections of the beam, means to deliver to the beam potentials proportional to the strengths of the signals to be recorded, alternative embodiments of means to translate the beam strength emitted within the envelope, and the lateral scans of such primary beam within the envelope, into forces outside of the envelope of strength proportional to the strength of the beam within the envelope, and to cause such so-produced forces to execute lateral scans exactly in harmony and synchronism with the lateral deflections of the beam within the envelope. Such details also include alternative disclosures of means to translate such outside forces into recordings on the tape, either as magnetic recordings, or as electrostatic force recordings. Said details also include showings of means to translate the forces outside of the envelope into sensing means to enable play-back of recorded signals carried by the tape. Various other details of such showings are also included in said figures, including means to amplify the strength of the beam or of the outside force which corresponds to such beam. Various other disclosures are also included in said figures. Since all such showings and disclosures are fully set out in said parent application, Serial No. 427,428, Letters Patent No. 2,976,354, it is not deemed necessary to repeat a description of such details of construction, and principles of operation here; but certain of such details of construction and operation will be referred to hereinafter during description and consideration of FIGURES 18, 19, 20 and 21, which disclose certain novel operations of recording and translation which may be produced by use of various of the features of such scanning units or other scanning units. Accordingly, reference is now made to said FIGURES 18, 19, 20 and 21, as follows:

In each of FIGURES 18 and 19 there is shown a combination of the recorder means with a conventional television receiver, and there are also shown several of the circuit elements of that receiver in conventional block schematic diagram form. In both of these figures such conventional elements are the same, and the schematic circuits illustrated in the two cases are alike as respects the television receiver itself. However, an important difference between the showings of FIGURES 18 and 19 resides in the fact that in FIGURE 18 the sound signals are recorded along a lineal recording of the tape, with use of a conventional sound recording element or head, and with conventional sensing from such sound track during play-back; whereas in FIGURE 19 there is disclosed an arrangement under which the sound signals are recorded by cross-scans superimposed on the cross-scans of the picture signals. This latter arrangement requires provision of one of the scanning units capable of producing such cross-scanning, for producing and/or sensing the recorded sound or audio signals; and also requires synchronizing signal provisions. It is also necessary that such synchronizing signal provisions for the second scanning unit (audio), shall operate simultaneously with those of the picture scanning unit. A further feature of difference between the showings of FIGURES 18 and 19, made necessary by reason of the recording of the audio signals by cross-scanning lies in this, that the scanning deflection controls of both of the scanning units must be synchronized, and produced in exact harmony. Accordingly, in the showing of FIGURE 19 provision is made for actuating the horizontal deflection controls of both scanning units from the same control lines.

It is also to be noted that the various recording units shown in FIGURES 18 and 19 may operate on either the electro-static or the magnetic recording principle, as desired, and they may operate on either the "ionizing" effect principle or the "conductor" principle, as desired. They may also be of the horizontal envelope scanning unit type,or the vertical envelope scanning unit type, both of which are illustrated in this application, or may be of other types, as desired. Consideration of the changes needed when changing from the recording to the sensing and translating operation will show that in some cases changes in circuitry are also necessary when using any selected form of the equipment embodying features of the present invention. Such changes are not necessarily of serious nature. However, in FIGURES 18 and 19 there are shown switching arrangements for enabling gang changes between the recording and sensing-translating operations, and such switching arrangements include changes in circuitry needed when changing in the one direction or the other.

It is also noted that as between the "ionizing" type and the "conductor" type of scanning unit, slight changes in circuitry are needed for the one type of operation as compared to the other type of operation. To avoid needless complexity of circuits illustrated in the figures, and to produce the desired showings in schematic form, various of the elements are shown in such schematic form, and with simple line connections between elements or units. Thus, in each of said figures there is shown a simple "detection" plate in connection with each of the cross-scanning units, in place of the two conductor translating unit shown in detail in various of the figures.

In FIGURE 18 the television receiver as a whole is shown at A and the recording or sensing unit as a whole at B. The line 202 is intended to distinguish these units from each other and to show generally how the circuit lines between the two units are interconnected. Such interconnection is shown by the cable indicated at 203. This cable will of course carry the necessary lines to establish the proper interconnections between such units A and B; and such cable may be provided with end plugs having terminals proper to provide the desired line connections; and the television receiver and the recorder should be provided with corresponding multiple conductor sockets to receive such cable end plugs.

There is shown a multiple line two throw switch 204 as included in the recorder unit B, but of course this switch might have been shown as included in the television receiver set A. However, since the television receiver will generally be delivered as a distinct unit without corresponding provision of the recorder, but with provision of the needed cable socket to receive the cable plug at a future time, it is preferred to include such switch as a portion of the recorder. This switch is shown as including the ten blades 205, 206, 207, 208, 209, 210, 211, 212, 213 and 214, connected for common control movement by the ganging element 215. If desired such switch may also be provided with a third or "Off" position between its two working positions. Of these two, that to the left, in which position the switch is shown in FIGURE 18, is the "Recording" position, and that to the right is the "Play-Back" position.

It is now mentioned that in the circuit arrangement shown in FIGURE 18 the switch blade 212 is for control of the antenna. During normal television reception and with or without simultaneous recording by the recorder, this blade establishes connection of the antenna to the antenna input connection of the television receiver, but during play-back this blade is in its right-hand position, with the antenna disconnected from the television receiver and dead. During such play-back the receiver is obtaining its picture signals from the previously recorded tape.

In FIGURE 18 the various blades are conveniently identified as to their general functions, as follows:

Blade 205, line 216, sound track detector plate.
Blade 206, line 217, and
Blade 207, line 218, synchronizing signal unit.
Blade 208, line 219, and
Blade 209, line 220, sound track unit.
Blade 210, line 221, synchronizing signal detector plate.
Blade 211, line 222, scanning tube detector plate.
Blade 212, line 223, antenna line.
Blade 213, line 224, and
Blade 214, line 225, electron beam strength control, for the picture recording scanning unit.

During recording the blade 205 connects by line 226 to a potential control unit 227; the blades 206 and 207 connect to the synchronizing unit 228 (or other suitable synchronizing unit of the receiver A) by the lines 229 and 230; the blades 208 and 209 connect to the audio amplifier unit 231 by the lines 232 and 233; the blade 210 connects by the line 234 to a potential control unit 235; the blade 211 connects by a line 236 to the potential control unit 237; the blade 212 connects by the line 238 to the antenna connection to the television receiver; and the blades 213 and 214 connect by the lines 239 and 240 to the picture and brightness lines of the television receiver kinescope.

At this point attention is called to the fact that when the recorder unit is of that type in which the recordings are magnetically made on a suitable form of tape, using either the "ionizing" effect or the "conductor" effect to transfer the electron beam effects to the outside of the tube, there is no need for inclusion of the detector plates beneath the tape, since both the recording and sensing operations are performed at the top of the tape; whereas such detector plates are needed when using the electrostatic type of recording and sensing. Accordingly, when using the magnetic type of recording, the switch blades 205, 210 and 211 will be unnecessary and the corresponding lines may be either eliminated or modified for other uses and purposes. Likewise the potential control elements 227, 235 and 237 may be eliminated when the recordings are of the magnetic type. Attention is also called to the fact that when using the electrostatic type of recording and sensing it may be desirable to modify the lines 222, 216 and 221, which connect to the detector plates by inclusion of various elements such as amplifiers, etc. Accordingly, there are shown such additional elements in said lines, as follows; an element X in the line 222, an element Y in the line 216, and an element Z in the line 221.

With the arrangement thus far described it will be found that during television receiver operations a recording may be made with the switch in its left-hand position as shown in FIGURE 18, the intensity of the electron beam of the scanning tube of the recorder following the intensity of the electron beam of the television receiver, and thus producing a record in which the intensities of the recorded scans follow faithfully the intensities of the kinescope scans; that the synchronizing signals are placed on the tape in exact harmony with the receipt of the synchronizing signals by the synchronizing elements of the television receiver—that is, at completion of each frame; that the horizontal scans of the electron beam of the recorder scanning unit exactly follow the horizontal scans of the kinescope electron beam; and that the intensities of the sound recordings exactly follow the sound intensities of the audio or sound waves sent to the speaker of the television receiver.

It will also be found that when it is desired to play-back from the tape recording to the television receiver such operation may be effected by throwing the switch to the righthand position, the tape having in the meantime been rewound. Thereupon it will be found that the synchronizing signals previously recorded by the tape will be fed back into the television receiver circuits so that the synchronizing corrections to be made in that television receiver will come from the tape recording, and will thus be correctly timed and placed with respect to the frames of the cross-scans being signalled by the recorder; that the horizontal cross-scans of both the television receiver and the tape recorder will be dictated by the saw-tooth generator of the television receiver for such horizontal scans; and that the sound wave signals recorded by the tape recorder will be delivered to the speaker of the television receiver or to suitable amplifying elements in proper harmony with scans and frames produced in the television receiver. Since the frequency of the cross-scans was dictated by the horizontal deflector and sawtooth generator of the television receiver during the recording operation, and which frequently is well standardized to meet F.C.C. requirements, and since the cross-scans of both the recorder and the television receiver are also controlled by the same instrumentalities during play-back, it follows that close harmony between the needed functions of the units will be produced during play-back, so that correct interpretation will occur. Furthermore, the incoming of the synchronizing signals from the recorded tape instead of from the ether, will ensure harmony between the scans recorded on the tape and such synchronizing signals so that the television receiver will be kept in proper step during needed corrections, with the playing-back from the tape. It is understood that during such playing-back the motor drive to the tape is provided by the same current supply as was used during the recording, as far as frequency and close regulation thereof are concerned.

The driving motor is shown as provided with the reversing switch 241 in the supply lines leading to the motor 242 by which the tape is driven. By this switch it is possible to reverse the direction of tape drive for rewind; but of course during playing-back the direction of motor drive and tape feed is the same as during recording.

Figure 5:
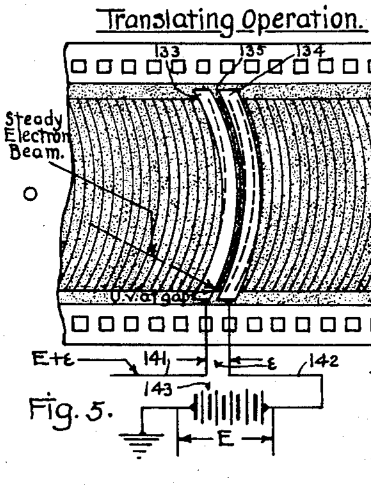
FIGURE 5 shows a view similar to that of FIGURE 4; but FIGURE 5 shows schematically a simple form of circuitry, which may be used for sensing and translating signals carried by the tape.

It is also noted that when using the magnetic type of recording and playing-back the lines 216, 221 and 222 will be properly connected to the air-gap conductor elements according to the showings of FIGURES 4, 5 and 6, and elsewhere, or to other elements suitable to perform the needed functions of laying down the magnetic recordings during recording, and of sensing the magnetic recordings during playing-back. Sufficient has been disclosed in this application, and in the parent application, Serial No. 427,428, Patent No. 2,976,354, and in other divisional applications based on said parent case, to enable the necessary changes to be made in said lines and their connections to the elements shown in FIGURES 4, 5 and 6, to enable proper operations to be performed when using the magnetic type tape recording and sensing, without burdening this specification and the drawings with further details thereof.

In view of the rather full description of the showing of FIGURE 18 it is deemed unnecessary to make extended description of FIGURE 19. However, the following further statements respecting the showing of FIGURE 19 are pertinent:

In FIGURE 19 there is not shown any linear sound track, which feature has already been referred to. Since it is desirable to bring both the audio and picture recordings into exact phase during sensing and translation, in FIGURE 19 there is included means to accurately adjust the spacing between the two scanning units 111 and 243, so that the audio and picture signals which correspond to each other will be simultaneously translated. Such means, as shown, includes the stud 244 connected to the unit 243 by a threaded connection including the sleeve 245 through which the stud is threaded, such sleeve being connected to the unit 243 by the bracket connection 246. By rotating the stud in one direction or the other the unit 243 will be shifted towards or away from the unit 111 for picture scanning, it being understood that the stud 244 is supported for rotation but held against endwise shift.

It is also noted that the lateral deflection signals for both of the units 111 and 243 are derived from the same source, so that the beam scans for both such units are held in exact synchronism at all times. To this end, the lateral deflection yokes for both such units are connected to the lines 114 and $114^a$, which are in turn both connected to lines connected to the horizontal deflector and synchronizing unit of the television receiver. Thus, with this arrangement, there is no need to provide a lateral deflection producing unit for either of such scanning units 111 and 243. In other embodiments of recording and playing-back, hereinafter to be described, which embodiments are designed especially for the recording and playing-back of audio signals, without picture signal provision, there are included saw-tooth generators or other lateral scan producing units, as parts of the recorder proper, to produce the lateral deflections needed for the recording and sensing operations. Such audio signal recording and sensing arrangements which do not include provision for recording and sensing picture signals, also include other necessary components of circuitry, as parts of the recorder units proper; all of which facts will appear presently.

The embodiment shown in FIGURE 20 is intended for making a record of all radio frequency signals reaching the antenna, which signals are of frequency within the recording ability of equipment based on the cross-scanning principle. It has already been shown that signals of the frequency of several megacycles per second may be recorded and sensed by the use of equipment embodying features disclosed in said parent application and patent No. 2,976,354, and divisional applications based thereon. In FIGURE 20 there is shown a conventional radio receiver (audio) having the tuning button 247, and the station indicator scale 248 of conventional design and construction and form. There is also shown the antenna connections 249, and the speaker 250, also of conventional form. Under conventional operation of this receiver the antenna 251 is connected directly to the antenna connection 249, unless the receiver is provided with an internal antenna, in which case the antenna 251 may be considered as being within the housing of the receiver itself. The elements above the line 252 are considered as being contained within or as comprising portions of the recorder unit.

Conventional radio (audio) receivers are not provided with various of the units needed for operation of the recorder. Accordingly, in the showing of FIGURE 20 such units are provided within or as portions of the recorder. These include the radio frequency electron beam strength control 253, the horizontal or lateral deflector and synchronizing unit (conveniently of the saw-tooth generator type) 254, and the unit 255 for producing the synchronizing signals during recording. These units may embody the needed elements for performance of their functions according to conventional and well understood principles presently in wide use in the electronic arts. There is also shown the radio-frequency amplifier 256 which handles the incoming signals for amplification of the radio frequency signals.

There is shown the eight blade double throw switch 257, including the blades 258, 259, 260, 261, 262, 263, 264 and 265. These may be thrown to the left, as shown in FIGURE 20, for recording, and to the right for playing-back, and if desired a central or off position may also be provided. In the arrangement shown it is only necessary to provide two conductors between the radio (audio) receiver, and the recorder, such connections being antenna lines, 266 from the antenna to the switch blades 264 and 265, and the connection 267, from the switch to the receiver antenna connection, 249.

With the switch in its left-hand position, as shown for recording, the antenna is connected to the antenna connection 249 so that the conventional radio receiver may translate any desired station which may be on the air and tunable and receivable, by tuning the button 247 to the proper station position. Thus, as far as the receiver operation is concerned, a normal selecting and receiving operation may be conducted. In this position of the switch, which is the recording operation, the blades 258 and 259 are connected to the unit 253 through the amplifier 268. Said blades connect by the lines 269 and 270 to the electron beam strength control of the scanning unit of the recorder. Thus the electron beam will be varied as to strength by the signals received by said unit 253. Said unit is connected to the unit 256 which receives radio-frequency signals directly from the antenna over the line 271, the switch being in the recording position. With such switch in such position the synchronizing unit 255 connects by the lines 272 and 273 to the synchronizing signal recorder unit, thus planting the synchronizing signals on the tape. Likewise, with the switch still in the recording position the scan records detector plate (when one is used) is connected by the line 274 and the switch blade 260 to adjustable potential, and the synchronizing signal detector plate (when used) is connected by the line 275 and the switch blade 261 to an adjustable potential, assuming that the arrangement is one which includes the detector plates instead of the air-gap sensing arrangement herein and elsewhere disclosed, both in said parent application, Patent No. 2,976,354, and other divisional applications.

With the above disclosed arrangements it is evident that all radio frequency signals reaching the antenna and which are within the recordable frequencies, will be recorded on the tape at their radio frequencies. Each carrier wave will be recorded superimposed on all other received carrier waves, so that there will be produced on the tape a recording which exactly simulates the effects being delivered to the antenna by the ether during the interval of recording. In other words the tape record will include all received radio frequency signals, not audio signals. If thereafter the switch be moved to its right-hand position, for playing-back, examination of the circuits will show that the antenna is now "Off," and that the scan records detector plate is connected to the antenna connection to the receiver. Accordingly, the playing-back will deliver to the receiver antenna connections the same mixture of signals as came in from the ether by way of the antenna; but since that mixture is a result of the intermixing of all of the received carrier wave frequencies, it is just as possible to now tune the receiver to any one of the carrier waves so received and recorded as it would have been to tune the receiver to the desired station's carrier wave had the reception been directly from the antenna instead of by way of the recording. Thus there has been provided means to enable recording of all of the frequencies which are on the ether during the interval of recording, and which are of frequency within the recordable range of the recorder. Thus, too there has been provided means which will make it possible to locate and translate signals carried by many stations or sending stations during the recording interval, and thus the use of the receiver is not limited to the reception of that single station which was being tuned by the receiver during the interval which has been recorded. Thus, too, there has been provided the means to enable finding or locating signals received during a given interval, long after the time of such interval of reception. Many other benefits and advantages will be found to follow from these functions.

The arrangement shown in FIGURE 21 differs from that shown in FIGURE 20 principally in this, that while the arrangement of FIGURE 20 is intended for the recording of radio frequency signals, which recorded signals may afterwards be sensed and translated and played-back to the radio receiver, there to enable the operator to select that program which he wishes to play on the radio, in the arrangement shown in FIGURE 21 the recordings are of the sound or audio frequencies themselves, and are thus in the much lower frequency range.

In the arrangement shown in FIGURE 21 the radio receiver 276 is provided with the conventional tuning button 279 for tuning to the selected radio frequency of the desired station; and there is shown, schematically, such a frequency tuning arrangement in the form of the oscillator 277 including the fixed inductance 277$^a$ and the variable capacitance 278 across such inductance, the variable capacitance being operated by use of the tuning button, 279. The dial 279$^a$ is provided for indicating the tuned station according to conventional arrangements. The speaker 280 is also shown, together with its coil 281, and connections 282 and 283 are provided for delivering the audio frequency to such speaker, so that the lines connected to said connections 282 and 283 carry the audio waves which correspond to the radio frequency signal which has been tuned, and which audio waves are delivered to the recorder. The arrangement shown in this figure includes means to make a tape recording of these so-tuned audio waves. When any other radio frequency is tuned, corresponding to another sending station, the audio waves then delivered over the connections 282 and 283 will correspond to the newly tuned program.

With a recording of the kind just described it is evident that play-back of any one of the recorded programs may be effected by delivering to the speaker connections 282 and 283 replicas of the audio recordings thus previously placed on the tape. At such times the antenna 284 is disconnected from the receiver, or, alternately the speaker coil and connections 282 and 283 may be disconnected from the receiver circuits during play-back; and since such circuit arrangements are well known it is not necessary to show them in full detail in FIGURE 21.

The line 285 shows schematically, the division point between those elements comprising portions of the receiver, and those, above such line, comprising portions of the recorder. The recorder shown then includes the audio frequency receiver element 286, the audio frequency electron beam strength control unit 287, the horizontal deflector and synchronizing unit 288, the synchronizing control unit 289, and the amplifier for electron beam strength control unit 290, when needed.

The ten blades, double throw switch 291 is provided in the recorder unit, which when thrown to its left-hand position as indicated in FIGURE 21, produces the needed connections for recording the audio waves then being produced by the radio receiver at its then tuned position, being the program then being played; and which switch, when thrown to its right-hand position, produces the needed connections for playing-back such audio wave recorded program to the speaker unit of the radio receiver. In view of the rather detailed description already given of several of the switching and related arrangements it seems unnecessary to repeat such descriptions here. It is, however, emphasized that with the present arrangement of FIGURE 21, there is being produced directly a recording of audio waves at their audio frequencies, on the tape record, and there are played-back, by the cross-scanning principle, such recordings, as distinguished from playing back such audio wave frequencies by the conventional linear recording and scanning principle.

Next is considered the embodiment shown in FIGURE 22. In this embodiment provision is made for simultaneously producing a tape recording of picture signals of a plurality of camera examinations of one or more subjects, the signals for such plurality of camera examinations being recorded as regularly recurring or cyclically recorded recordings of elemental areas of the several objects being examined by the cameras. To this end there are provided the plurality of cameras—in the illustrated case, three—examining the object or objects. In the illustrated case these three cameras, 292, 293 and 294 are shown as being directed to a common commercial unit, 295, such as the tuyeres of a blast furnace whose operation is under examination, and whose operations at different points are to be tape recorded. These cameras deliver individual scanning signals on three successive high frequency waves coming at regular time spacing, as when spaced one hundred twenty degrees apart, according to well understood principles in the television art. Provision is then made for sampling the "highs" of these successive signals, by use of the sampler unit shown schematically at 296, and delivering the sampled highs in mixed form over the lines 297 and 298. Suitable synchronous generator means 299, sampling pulse generating means 300, and accessories are provided as portions of the camera section, so indicated in FIGURE 22. The synchronizing signals are delivered over the lines 301 and 302, for use in the recorder; and horizontal deflection control signals are delivered over the lines 303 and 304 also for use in the recorder. Thus provision is made for delivering to the recorder cross-scanning unit not only the needed mixed highs signals for use in controlling the intensity of the electron beam of the scanning tube, but also for controlling and producing horizontal scans of that electron beam, and for delivering the necessary synchronizing signals to the proper unit of the recorder.

In the schematically illustrated embodiment of FIGURE 22 there is shown a receiver and kinescope section to which the recorded signals may be delivered from the tape recorder, and by which section such signals may be translated into the desired plurality of viewable pictures on the several kinescope screens. Thereby there is provided the means to enable playing-back such plurality of recorded picture signals, so that the happenings which have occurred at the corresponding camera viewed locations can be simultaneously and comparatively viewed by an individual or a group of individuals, at a time and place convenient and desirable for producing such subsequent operations. Thus there are shown the three kinescopes 305, 306 and 307 located in the receiver section, together with the sampler by which the received signals are separated from each other and delivered to said three kinescopes in regularly recurring progression, such sampler being numbered 308, the deflecting circuit unit 309 for producing both the horizontal and vertical deflecting signals for the kinescopes, and the television receiver unit 310 to which the sensed signals from the scanning unit of the recorder are delivered during playing-back.

The eight blade, double throw switch 311 is provided in the recorder section for effecting the needed controls of circuit connections during recording (left-hand switch position as shown in FIGURE 22) and during playing-back (right-hand position of the switch). It is understood that this switch may also have a central of "Off" position if desired. It is not deemed necessary to describe the various circuit connections in full detail here, as they will be readily understood from earlier discussions along this line contained in this specification.

It is pointed out that with the mixed highs arrangement disclosed in this figure it is possible to place the "dot" signals coming from the several cameras on the cross-scans of the tape in regularly recurring progression in various manners. One such manner is that shown in FIGURE 20 of said Letters Patent No. 2,976,354, and certain divisional applications of such parent case, and which dot arrangement is also intended for making a record of the color television signals by the mixed highs arrangement. Such being the case it will be understood that many of the features of such a dot recording can also be used for color television recordings. There will presently be disclosed in this case a color television recording arrangement in fuller detail. It should be pointed out, however, that if desired each full line scan of the receiver may be assigned to a corresponding full line scan of a camera, 292, 293 and 294, of FIGURE 22, with provision for sending the scan signals to the recorder as full line scans from the three cameras in regular sequence and recurring succession. In such case each "dot" will be one scan line in length. In such case the receiver will be arranged, as respects its connections and its sampler 308, to send the played-back scan lines of the recorder to the three kinescopes in succession and repetitious order of progression. Attention is called to the scan line arrangement for color operations, shown in FIGURE 21 of said Patent No. 2,976,354, as illustrative of such a scheme of scanning, although that figure is illustrative particularly of the recorded signals of a color television program, on the three primary color basis.

In FIGURE 23 there is shown schematically, an arrangement whereby color television signals, being currently tuned and received by a conventional form of color television receiver may also be recorded on tape according to the herein disclosed recording arrangements, and afterwards played-back to that same television receiver as a color replica. It is not necessary to describe these arrangements in full detail in view of the extended descriptions already given; but the following further explanations are in order:

The specific arrangement shown in this figure is one in which the color televised signals are delivered to the receiver by the so-called "mixed highs" system on the three primary color basis. In FIGURE 23 there are schematically shown the three receiver kinescopes 312, 313, and 314, for the red, the green and the blue, respectively; and there are shown the dichroic reflectors 315 and 316, together with the common reflector 317 for delivering the three color kinescope translated sets of signals to the common viewing screen 318, according to a well understood arrangement. The sampler 319 is shown for distinguishing the signals of the three sets and delivering such signals properly to the several kinescopes, for production of the completely translated color replica. The deflecting circuits for both horizontal and vertical deflections are shown at 320, and the horizontal deflection control lines 321 and 322 extend from this control to the recorder (through the switch, presently to be referred to) for control of the horizontal scans of the recorder scanning tube, according to the principles already disclosed herein.

The television receiver, etc., is shown at 323 for delivering the desired signals which arrive over the antenna 324, to the sampler 319 for the three kinescopes of the receiver, and to the sampler 325 for delivery to the recorder instrumentalities as presently to be shown. The unit 325 may also be understood to be a mixer as designated on FIGURE 23. This unit 325 actually delivers mixed signals, in amplified form, to the electron beam strength control element of the recorder scanning unit, so that all of the mixed signals will go to the recorder for placement on the tape in regularly recurring order, while at the same time said signals are being separated from each other and delivered separately to the several kinescopes in proper sequence.

The synchronizing signals for recording on the tape are delivered from the unit 320 through the amplifier 326 to the lines 327 and 328 for delivery to the synchronizing signal recording unit of the recorder. The usual sound trap 329 is shown for separating the sound signals received over the ether for delivery to the receiver speaker as audio signals in conventional manner, an audio amplifier 330 being shown in such circuits. The audio signals are then delivered over the lines 331 and 332 for transmission to the sound recorder of the recording unit.

Provision is made for delivering the antenna received signals directly to the unit 323 of the television receiver during normal reception, and during the production of a recorded record; and for disconnecting the antenna from the television receiver and connecting the antenna connection of the television receiver to the proper sensing element of the scanning unit of the recorder during playing-back. Examination of FIGURE 23 thus shows the line 332[a] leading to the right-hand stationary contact of the switch blade for the line 333, which line connects to the recorder scanning unit sensing element. Thus, when the switch unit 334 is moved to its right-hand or playing-back position, the recorder sensed signals are delivered to the television unit 323 for operation of the television receiver from the recorded signals instead of directly from the signals received by the antenna over the ether.

The ten blade double throw switch 334 is provided, which, when thrown to its left-hand position, ensures proper connections for recording the color television signals received from the ether, and when in its right-hand positions ensures proper connections for playing-back the so-recorded signals. It is not believed necessary to describe the various connections to this switch, in view of the extended descriptions already given earlier herein.

What is claimed is:

1. Means to make a time sequence and spatially successive record of all radio frequency signals arriving at a given location, said radio frequency signals including at least one set of radio frequency signals comprising a carrier wave of predetermined radio frequency and of variations corresponding to transmitted intelligence, means to sense said recorder radio frequency signals in the time sequence and spatial succession of their recordings, means to receive and tune radio frequency signals of the frequency of said set of radio frequency carrier wave signals including means to translate the variations of said tuned signals into perceptive intelligence, and operative connections between the sensing means and the receiving and tuning means, constituted to deliver to the receiving and tuning means the signals sensed by the sensing means in the time sequence of sensing said signals.

2. Means as defined in claim 1, wherein said record comprises a series of substantially parallel cross-scan records on a longitudinally extending carrier element, and wherein the time and spatial successions of the recorded signals are located along successive scans and with time progress from scan to scan in a pre-determined longitudinal direction along the carrier element.

3. Means as defined in claim 1, wherein the radio frequency signals arriving at said given location and recorded include intermingled radio waves of a plurality of sets of radio frequency signals each comprising a carrier wave of pre-determined radio frequency different from the radio frequencies of other said carrier wave frequencies and of variations corresponding to transmitted intelligence individual to such carrier wave, and wherein the means to receive and tune radio frequency signals and translate the variations of the tuned signals into perceptive intelligence includes selecting means constituted to select and make operative the tuning and translating means for the frequency of any selected carrier wave.

4. Means as defined in claim 3, wherein said record comprises a series of substantially parallel cross-scan records on a longitudinally extending carrier element, and wherein the time and spatial successions of the recorded signals are located along successive scans and with time progress from scan to scan in a pre-determined longitudinal direction along the carrier element.

5. Means as defined in claim 3, together with means to make operative or inoperative the recording means, and means to make operative or inoperative the connections between the sensing means and the receiving and tuning means.

6. Means as defined in claim 5, together with interconnections between the operative or inoperative making means for the recording means, and the operative or inoperative making means for the receiving and tuning means constituted to make operative either of said operative or inoperative making means when the other of said operative or inoperative making means is inoperative.

7. A signal recording and translating system including in combination a tape constituted for the reception of intelligence, means to move said tape linearly, means to produce force emitting cross scans at successive spacings along the tape, means to receive radio frequency incoming signals including carrier waves of at least one carrier wave frequency, connections between said radio frequency incoming signal receiving means and the cross scan producing means constituted to cause the cross scan producing means to produce the cross scans of varying strength corresponding to the varying strengths of the radio frequency carrier wave signals received by the incoming signal receiving means, means to receive and tune signals of said carrier wave frequency, signal sensing means in proximity to the tape constituted to successively sense the strengths of the forces emitted along the successive cross scans on the tape, and connections between said sensing means and the radio frequency receiving and tuning means, the radio frequency receiving and tuning means being constituted to tune the carrier wave frequency of the incoming carrier wave signals.

8. A system as defined in claim 7, wherein the means which receives the radio frequency incoming signals receives signals of a plurality of carrier wave frequencies, and wherein the radio frequency receiving and tuning means is constituted to receive said plurality of carrier wave frequencies and tune a selected carrier wave frequency.

9. Means as defined in claim 8, wherein the means to receive and tune the carrier wave signals also includes means to translate the tuned selected carrier wave frequency signals for production of audio frequency signals.

10. Means as defined in claim 8, wherein the connections between the radio frequency incoming signal receiving means and the cross scan producing means, and the connections between the sensing means and the radio frequency receiving and tuning means, include means constituted to select and make operative either the connections which are between the radio frequency incoming signal receiving means and the cross scanning producing means, or the connections which are between the sensing means and the radio frequency receiving and tuning means.

11. Means as defined in claim 10, wherein the means to receive and tune the carrier wave signals also includes means to translate such carrier wave signals for production of audio frequency signals.

12. Means to produce a tape recording of radio frequency signals, comprising in combination a tape, means to mount said tape for endwise movement thereof, means to produce such endwise movement of such tape, means to produce uniformly spaced cross-wise extending force emitting stripes on said tape, and means to produce radio frequency signals for recording on said tape; said force emitting stripe producing means including a deflectable beam electron unit including an envelope, means to produce a deflectable beam within the envelope with impact of the beam against an elemental area of an elongated target, means to support the deflectable beam element with the elongated target parallel to the force emission stripes produced on the tape, means to produce lateral deflections of the beam and traverse of said elemental area along the target, means to produce a force at the exterior of the envelope and in alignment with the location of such elemental area, including means within the envelope at the location of the elemental area and activatable by the impact of the beam at such area to produce a beam force exterior to the envelope in alignment with the elemental area, said exterior beam force moving laterally of the tape in a path parallel to the force emitting stripes produced on the tape, means to direct such exterior beam force towards the tape, said exterior beam force acting on the tape to produce a force emitting scan thereon, means to modulate the strength of the deflectable beam during lateral deflections of such beam, the strength of the beam force exterior to the envelope being proportional to the deflectable beam strength during lateral movement of the beam and producing modulation of the force emitted by the force emitting stripe, means to receive radio frequency signals to be recorded, and connections between the radio frequency receiving signal means and the beam strength modulating means of the electron unit.

13. Means as defined in claim 12, wherein the means within the envelope at the location of the elemental area and activatable by the impact of the beam at such area to produce a beam force exterior to the envelope in alignment with the elemental area, comprises the elongated target formed of material excitable by impact of the beam at the elemental area and constituted to produce wave lengths in the ionizing range, together with envelope material in proximity to the elongated target transparent to such ionizing wave lengths.

14. Means as defined in claim 12, wherein the means within the envelope at the location of the elemental area and activatable by the impact of the beam at such area to produce a beam force exterior to the envelope in alignment with the elemental area, comprises a series of electrical conductors extending through the envelope along the target area, the inner end portions of such conductors being in position for impact of the beam successively during beam scan, and the outer ends of such conductors being in proximity to the tape along a path corresponding to the path of scan of the beam within the envelope.

15. Means as defined in claim 12, wherein the radio frequency signals to be recorded include modulated carrier waves of at least one carrier wave frequency.

16. Means as defined in claim 15, wherein the radio frequency signals to be recorded include modulated carrier waves of a plurality of carrier wave frequencies.

17. Means as defined in claim 12, together with means to sense and translate the forces emitted by the stripes on the tape and deliver signals proportional to such forces, said sensing and translating means including a deflectable beam electron unit including an envelope, means to produce a deflectable beam within the envelope with impact of the beam against an elemental area of an elongated target, means to support the deflectable beam electron unit with the elongated target parallel to the force emission stripes on the tape, means to produce lateral deflections of the beam and traverse of said elemental area along the target, means to produce a force at the exterior of the envelope and in alignment with the location of such elemental area, including means within the envelope at the location of the elemental area and activatable by the impact of the beam at such area to produce a beam force exterior to the envelope in alignment with the elemental area, said exterior beam force moving laterally of the tape in a path parallel to the force emitting stripes, signal pick-up means located between said exterior beam activated force and the proximate stripe of the tape and of lateral dimension across the tape width corresponding to the path of the exterior beam activated force and subject to the combined exterior beam activated force and the force emitting strength of the proximate tape stripe corresponding to each location of the beam during beam deflection within the envelope, and a tunable radio receiver having a radio frequency input connection, and connections between the signal pick-up means aforesaid, and the radio frequency input connection of the tunable radio receiver.

18. Means as defined in claim 17, wherein the radio frequency signals to be recorded include modulated carrier waves of at least one carrier wave frequency, and wherein the tunable receiver includes means to receive such carrier wave frequency, and includes means to tune such carrier wave frequency and means to produce audio frequency waves corresponding to the modulations of such radio frequency carrier wave.

19. Means as defined in claim 17, wherein the radio frequency signals to be recorded include modulated carrier waves of a plurality of carrier wave frequencies, and wherein the tunable receiver includes means to receive such carrier wave frequencies, and includes means to tune a selected carrier wave frequency and means to produce audio frequency waves corresponding to the modulations of such selected radio frequency carrier wave.

References Cited in the file of this patent

UNITED STATES PATENTS

| | | |
|---|---|---|
| 2,716,048 | Young | Aug. 23, 1955 |
| 2,900,443 | Camras | Aug. 18, 1959 |
| 3,020,356 | Barry | Feb. 6, 1962 |